United States Patent [19]

Gazuit

[11] 3,837,770

[45] Sept. 24, 1974

[54] VULCANIZING PRESS INTENDED FOR CURING RADIAL TIRES BY MEANS OF A BLADDER OF TOROIDAL SHAPE

[76] Inventor: Georges Gazuit, Chemin Chauveau, Montlucon, France

[22] Filed: Sept. 28, 1972

[21] Appl. No.: 293,089

[30] Foreign Application Priority Data
Sept. 28, 1971 France .............................. 71.34816

[52] U.S. Cl. .................................... 425/33, 425/52
[51] Int. Cl. .............................................. B29h 5/02
[58] Field of Search ............. 425/33, 32, 29, 36, 39, 425/52, 23

[56] References Cited
UNITED STATES PATENTS

| | | | |
|---|---|---|---|
| 2,730,763 | 1/1956 | Brundage | 425/33 |
| 2,775,789 | 1/1957 | Sodequist | 425/33 |
| 2,808,618 | 10/1957 | Sodequist | 425/33 |
| 3,337,918 | 8/1967 | Pacciarini et al. | 425/39 |
| 3,396,221 | 8/1968 | Ballo et al. | 425/52 X |
| 3,465,385 | 9/1969 | Zangl | 425/36 |
| 3,550,196 | 12/1970 | Gazuit | 425/29 X |
| 3,585,686 | 6/1971 | Balle | 425/23 |

*Primary Examiner*—J. Howard Flint, Jr.
*Attorney, Agent, or Firm*—Amster & Rothstein

[57] ABSTRACT

This bladder is a piece of rubber or other air-impervious plastic material which is adapted to be introduced into the crude tires fitted in vulcanizing presses to constitute the internal element of the mould in which the tire is to be cured.

This bladder is of substantially toroidal configuration, has a constant thickness and dimensions approaching very closely the internal dimensions of the crude tire to be cured, and comprises two beads of same diameter and same axial direction.

This bladder is intended more particularly for use in presses designed for vulcanizing radial ply tires.

5 Claims, 9 Drawing Figures

VULCANIZING PRESS INTENDED FOR CURING RADIAL TIRES BY MEANS OF A BLADDER OF TOROIDAL SHAPE

FIELD OF THE INVENTION

The present invention relates in general to bladders or bags of the type used in presses for vulcanizing tires, rubber articles or other air-impervious plastic articles, said bladders being introduced into the crude tires and inflated, in vulcanizing presses, and constituting the internal element of the mould in which the tire is eventually cured.

BACKGROUND OF THE INVENTION

The bladders used in modern vulcanizers are either of substantially cylindrical configuration, as shown in FIG. 1 of the attached drawings, with an upper bead and a lower bead adapted to be clamped between metal flanges controlling the movements of said lower bead, or of substantially toroidal configuration, as shown in FIG. 2, with a single bead positioned at the bottom, the upper portion being reinforced to withstand the stress exerted thereon by a metal "punch" provided for inserting said upper portion into the central well of the vulcanizing press, after the vulcanization proper, to permit the release and removal of the cured tire.

However, these two types of bladders are not fully satisfactory for most applications, notably for vulcanizing radial tires.

When the bladder initially molded to a substantially cylindrical shape is given the necessary toroidal shape, it undergoes a considerable elongation generating shifting movements or creeping in the tire to be vulcanized; as the toroidal bladder is by construction asymmetric in relation to a meridian plane of the tire, the creeping of the tire when positioning same is not symmetrical and as a result the tire is shifted firstly during the introduction of the bladder and then during the inflation thereof.

SUMMARY OF THE INVENTION

The present invention relates to a bladder designed more particularly for vulcanizing radial ply tires and adapted to avoid the inconveniences of hitherto known bladders of this character as set forth hereinabove. To this end, the bladder according to the present invention is characterized in that it is moulded to a toroidal shape with a constant wall thickness, to a dimension approaching very closely the internal dimension of the crude tire to be vulcanized, and comprises two beads of same diameter; it is therefore symmetrical in relation to the meridian plane of the tire.

Its constant wall thickness and toroidal shape, the beads having the same diameter, and the symmetry of the movement of these beads, ensure a first contact in the median portion of the tire, then a symmetric progression of this contact on either side of this median portion, a most desirable requirement for avoiding any shift in the tire carcass and obtaining a perfectly centered tire.

The present invention is also concerned with a vulcanizing press designed for curing radial tires by means of a bladder of the type set forth hereinabove and comprising a central well in which the bladder is adapted to retract to permit the removal of a cured tire and its replacement with a crude one, said press being characterized in that it comprises in said well an axial control shaft, a pair of flanges coaxial to said control shaft, the periphery of each flange having secured thereto one of the bladder ring-beads, said flanges being adapted to slide along their common axis, the upper flange being driven for translation from said control shaft through a central aperture of the lower flange, and a movable abutment member adapted to drive said lower flange upwards when it engages same during its upward movement, with a suitable relative axial spacing between the two flanges, said upper flange being adapted to drive the lower flange downwards when it engages same during its downward travel.

According to a modified and improved form of embodiment of this vulcanizing press said upper flange is not driven directly from said control shaft but through the medium of a hydraulic actuator comprising a relief valve opening automatically when the pressure exerted on the fluid contained therein exceeds that developed by normal frictional contacts.

Thus, to operate this press under the desired conditions, the two flanges and the bladder are moved bodily upwards to their uppermost position in which their axis of symmetry is coincident with that of said ring-beads of the mould in the open position thereof; then the operator checks whether the pressure in said actuator is equal to the maximum value permitted by the setting of said relief valve, and under these conditions, when the mould is closed (this closing movement resulting only from the downward movement of the upper flange, as mentioned hereinabove), a stress is exerted on the actuator piston so as to operate the relief valve, whereby the axis of symmetry of the bladder remains constantly coincident with that of the ring-beads of the curing mould, since it is only in this specific position that no stress outside the stress resulting from normal frictional contact is exerted on the actuator.

To prevent the bladder from damaging by frictional contact likely to cause tearings in the inner surface of the lower lateral surface of the cured tire, after the vulcanization, when stripping the tire and during the collapse of said bladder towards the bottom of said well, as a consequence of the upper flange carrying along the lower flange after engaging same, it was discovered, according to another feature characterizing this invention, that it was advisable to firstly raise the lower flange to permit the ingress of air between the bladder and the lower portion of the tire, so that the bladder could subsequently be driven very easily, as a unit, towards the bottom of said well, without producing any frictional contact with the tire.

BRIEF DESCRIPTION OF THE DRAWINGS

The attached drawings illustrate by way of example a typical form of embodiment of the bladder according to this invention, and two typical forms of embodiment of a vulcanizing press utilizing this type of bladder. In the drawings.

DESCRIPTION OF THE PREFERRED EMBODIMENT

Figure 2:
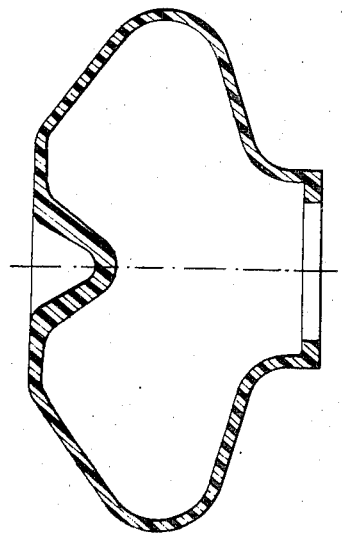
FIGS. 1 and 2 are diametral sections showing two well-known types of bladders already mentioned in the foregoing for explanatory purposes.
Figure 1:
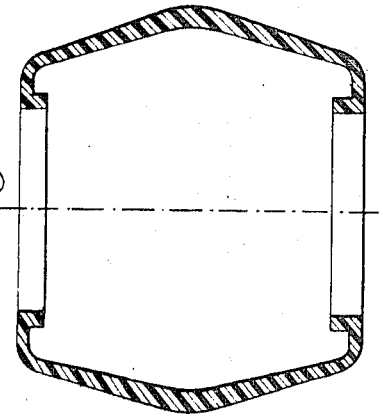
Figure 3:
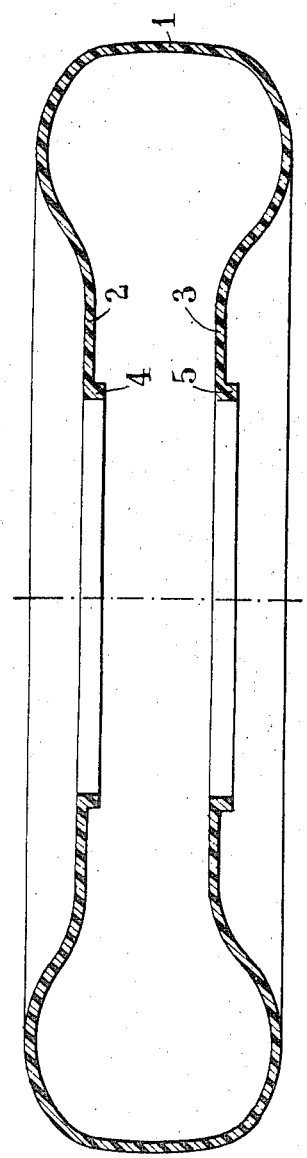
FIG. 3 is a similar view but showing the bladder of this invention.
Figure 4:
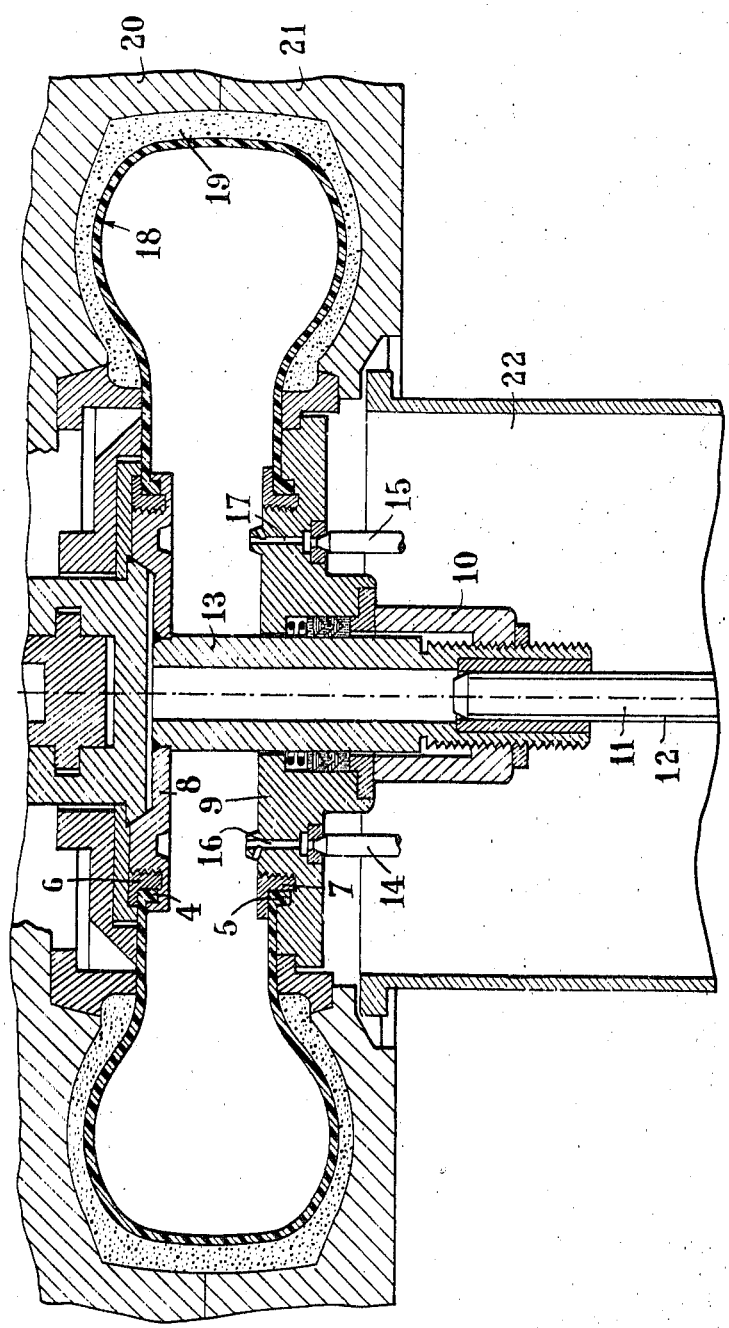
FIG. 4 is a fragmentary vertical axial section showing one portion of a press according to this invention during the vulcanization performed by using the bladder of FIG. 3.

The same reference numerals are used throughout the description of the two main forms of embodiment of the press of this invention for designating the same component elements. The bladder illustrated in FIG. 3 comprises a toroidal portion 1 having a constant thickness and an outer surface approaching very closely the inner surface of the crude tire to be vulcanized, of which the extensions 2 and 3, of same thickness and dispoed symmetrically to the median plane of the toroidal portion, terminate with a pair of ring-beads 4 and 5, of same diameter and projecting both downwards.

These ring-beads are secured by means of a pair of ring nuts 6 and 7 to a pair of metal flanges 8 and 9, respectively, adapted to be moved towards or away from each other by rotating the screw shaft 11 and thus causing the translation of the tapped socket 12 axially rigid with another larger socket 13 rigidly connected at its upper end with the upper flange 8; the lower tapped portion of socket 13 is externally screw-threaded, to permit the axial adjustment of the tapped abutment member 10 adapted, during the upward movement of socket 13 and upper flange 8, to carry along the lower flange with the desired relative spacing depending on the size of the tire to be moulded; during the downward movement of said socket 13 and flange 8 the latter drives directly the lower flange 9.

The conduits 14 and 15 and the ports 16 and 17 formed in flange 9 permit of inflating and deflating the bladder 18 located inside the tire 19 disposed beforehand in the two-section mould 20, 21.

Figure 5:
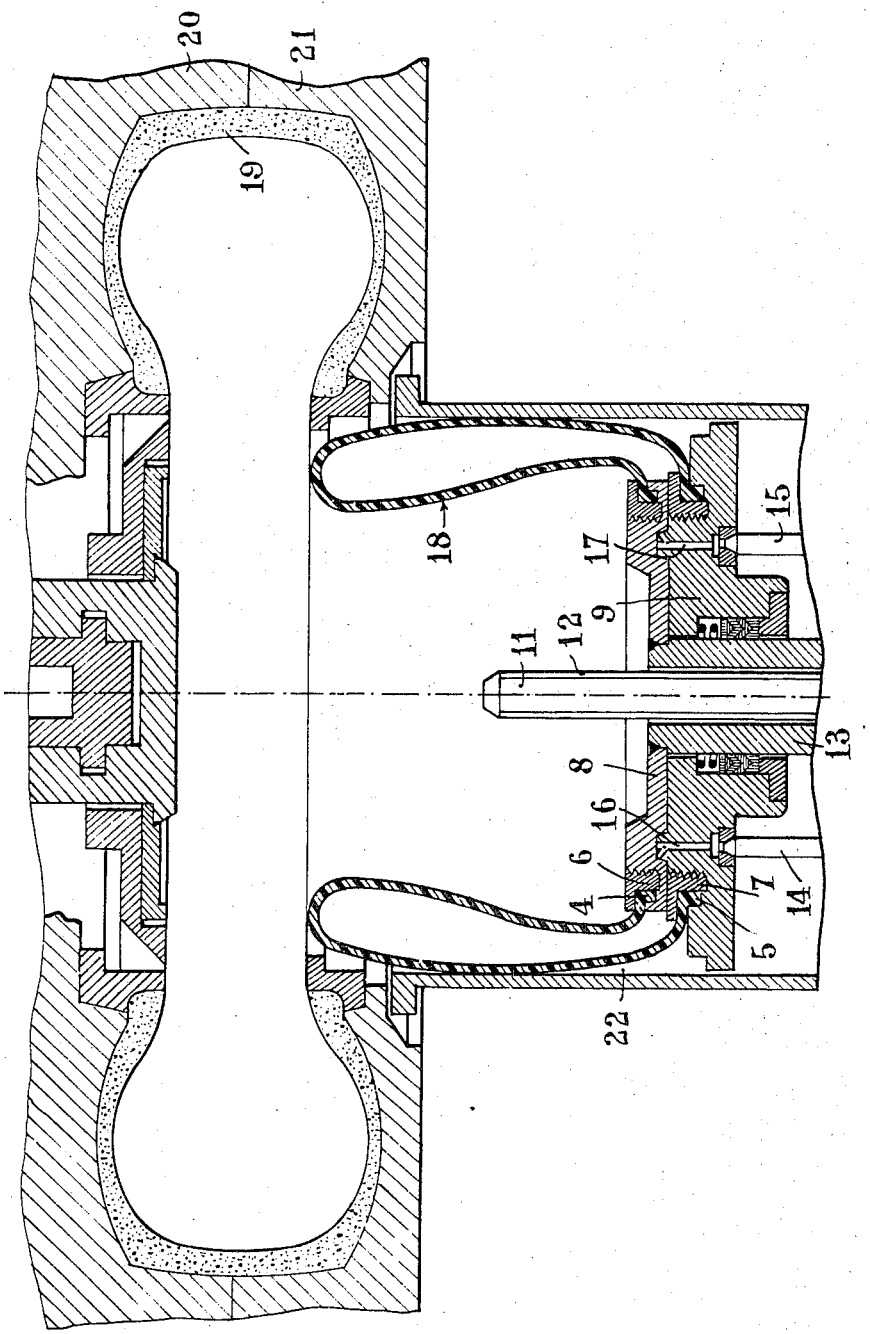
FIG. 5 is a similar view showing the position of the various elements at the end of the curing operation.
Figure 6:
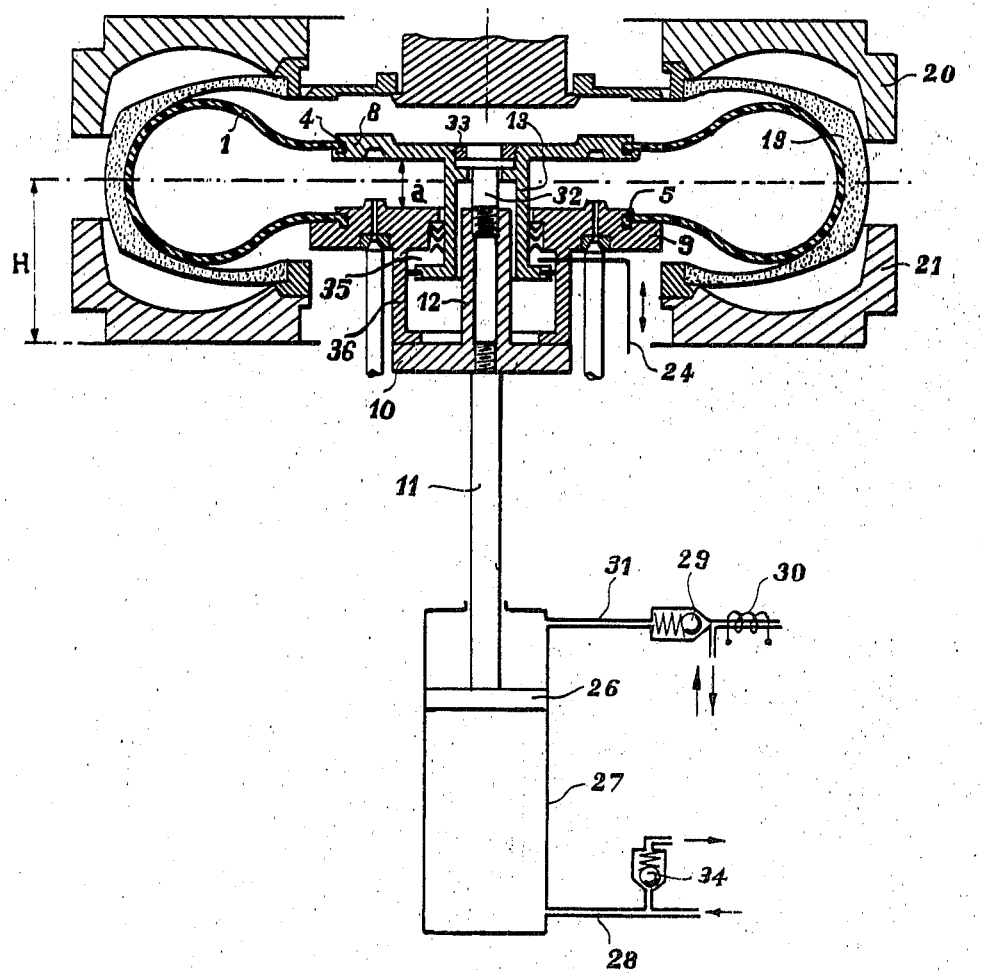
FIG. 6 is a fragmentary sectional view showing a vulcanizing press according to the invention, the mould being open.
Figure 7:
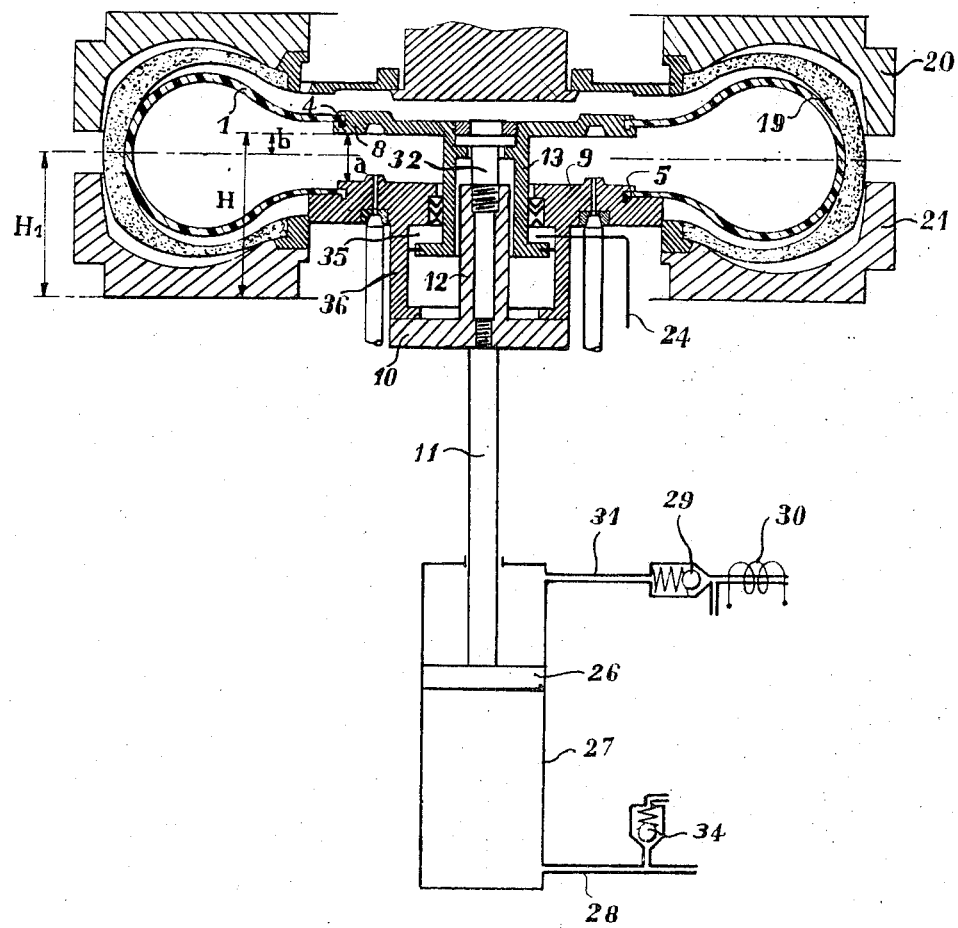
FIG. 7 is a view similar to FIG. 6, showing the parts during the mould closing movement.

As shown in FIG. 5, at the end of the operation this bladder 18 is retracted or collapsed completely within the well 22 of the vulcanizing press, so that the freshly vulcanized tire is cleared completely and can be removed very easily and replaced with another, crude tire to be vulcanized.

In a improved form of embodiment illustrated in FIGS. 6 to 9 of the drawings the shaft 11 controlling the movement of translation of the upper flange 8 is not rotatably mounted and operates only in axial translation under the control of a hydraulic actuator of the cylinder and piston type, arranged and mounted with a view to keep the plane of symmetry of the bladder 1 constantly coincident with that of the mould ring-beads 4 and 5.

Figure 9:
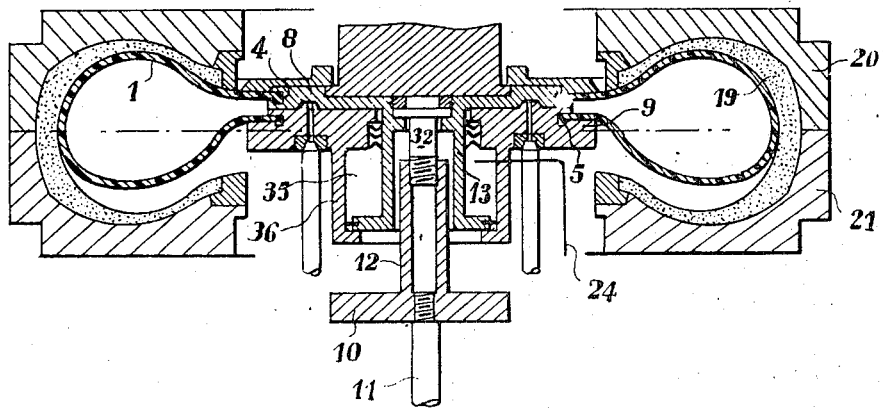
FIG. 9 is another similar view showing another possible modification.

To this end, the upward movement of control shaft 11 and upper flange 8 driving through socket 12 the lower flange 9 is controlled by the piston 26 of a double-acting actuator 27 responsive to a power fluid delivered through a pipe line 28; this upward movement can be stopped exactly at the desired level, such that the plane of symmetry of flanges 8 and 9 merges into that of the two half-moulds or mould sections 20 and 21, in the open-mould position shown in FIG 9, by means of a ball- valve 29 controlled by means of an electromagnet 30 and adapted to block the exhaust of fluid through pipe line 31; the screw 32 engaging the tapped upper end of socket 12 rigid with control shaft 11 permits of adjusting the maximum axis spacing $a$ between the two flanges 8 and 9, since the abutment member 10 driving the lower flange 9 upwards is rigid with the socket 12; any untimely misadjustment is safely prevented by the provision of a lock nut 33.

To maintain the coincidence between the plane of symmetry of the flanges and the plane of symmetry of the mould sections 20, 21 during the mould closing movement, there is provided in the feed circuit 28 of the lower end of cylinder 27 a relief valve 34, so that this valve 34 will operate when the pressure in the lower portion of cylinder 27 exceeds a predetermined threshold value slightly greater than that of the frictional resistances produced during the operation of the device.

The operation takes place as follows:

The upward movement of control shaft 11 brings the upper flange 8 and lower flange 9, disposed at a suitable relative spacing $a$, depending on the dimensions of the tire to be moulded, to a level H such that the plane of symmetry of bladder 1 is coincident with that of the two mould sections 20 and 21; when the mould is closed by lowering the upper mould half 20, the lower mould half 21 remaining stationary, the plane of symmetry of the mould is firstly lowered by a distance $b$ to reach the level $H_1$ such that $H = H_1 + b$; during the downward movement the pressure exerted on the crude tire 19 and bladder 1 by the upper half mould 20 increases with the resistance to deformation of the crude tire, and this pressure increment is transmitted to the lower portion or chamber of actuator 27 of which the pressure becomes higher than that contemplated for the operation of the relief valve 34 and, therefore, fluid contained in this lower portion is expelled and the height or level of the upper half-mould 20 decreases by an amount $b$ such that the plane of symmetry of the bladder is now coincident with the plane of symmetry of the mould, since only in this position no stress is exerted on the bladder and therefore on the fluid contained in the lower portion of cylinder 27.

Figure 8:
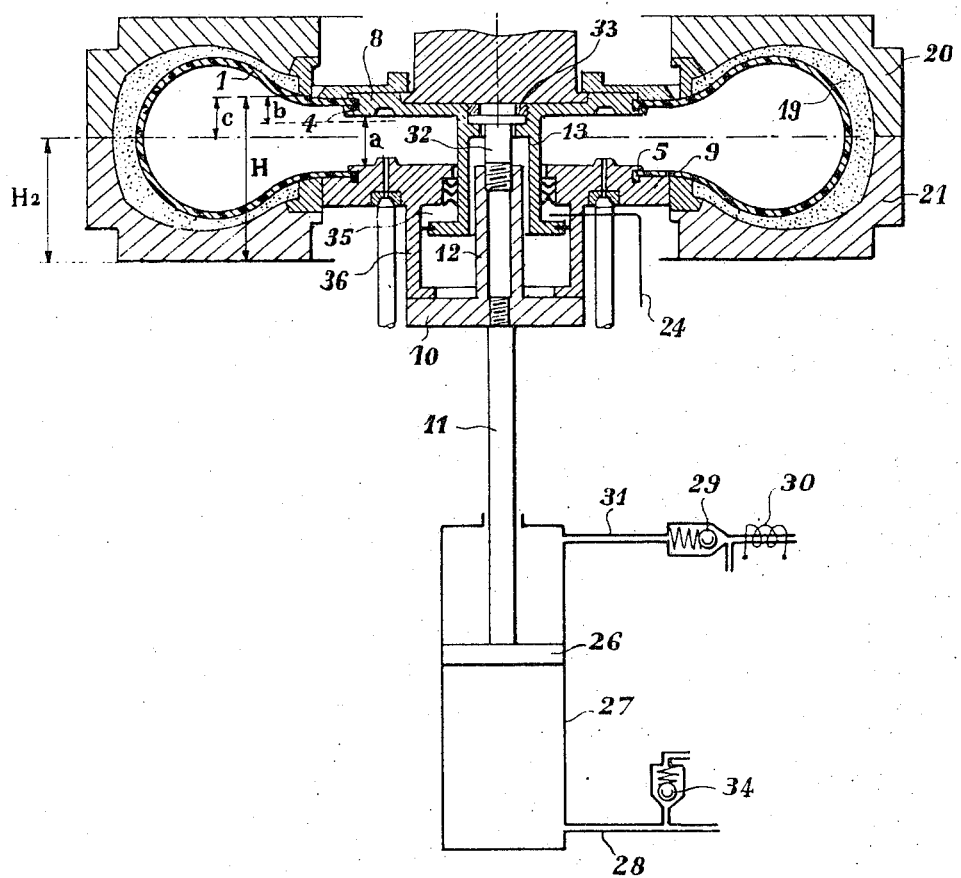
FIG. 8 is another similar view showing the mould in its fully closed condition.

Continuing the mould closing movement will provide the condition shown in FIG. 8 with its plane of symmetry at a level $H_2$ reduced by an amount $c$ such that $H = H_2 + c$; similarly, and for the reasons given hereinafter, the volume of the lower chamber of actuator 27 has decreased by said amount $c$ so that the plane of symmetry of the bladder remains coincident with the plane of symmetry of the mould.

Furthermore, a small hydraulic single-acting actuator comprising an annular chamber 35 is provided between the socket 13 rigid with the upper flange 8 and the socket 36 rigid with the lower flange 9.

Assuming that the mould is closed and the tire cured as shown in FIG. 9, if a fluid under pressure is introduced into the annular chamber 35, a relative movement is produced between sockets 35 and 36, thus reducing and possibly eliminating the distance $a$ between the two flanges; if this pressure is lower than that prevailing in the lower chamber of actuator 27, the lower flange 9 will rise, as shown in FIG. 12, thus allowing air to penetrate into the lower portion of the vulcanized tyre 19, i.e. between this tire and the bladder 1.

Under these conditions, the upper portion of the bladder can easily be removed by actuating the cylinder 27 for lowering the upper flange 8 and cause said bladder to collapse completely into the well and without producing any frictional contact with the inner wall of the tire and therefore without any risk of damaging the tire itself.

Of course, the various forms of embodiment described hereinabove with reference to the accompanying drawings are given by way of illustration, not of limitation, so that many modifications and variations may be brought thereto without departing from the basic principle of the invention as set forth in the appended claims. Thus, notably, the mould of the vulcanizing press may be of a completely different type in lieu of the type illustrated, and, more particularly, comprise more than two elements, for example three.

I claim:

1. Vulcanizing press intended for curing crude radial tires by means of a bladder of toroidal shape having two beads of same diameter secured to the outer periphery of a pair of parallel coaxial flanges driven by means of an axial shaft, said press comprising a cylindrical socket secured to the underface of the upper flange and formed with an integral ring at its base, a sleeve rigid with the lower flange and having its inner wall adapted to slide freely between said axial shaft and the socket of said upper flange, the outer wall of said sleeve being adapted to abute said ring of said socket, a hydraulic cylinder and piston unit adapted to control the shaft movement in either direction and an exhaust valve at the bottom of said unit which becomes operative when the pressure of the hydraulic fluid contained therein exceeds that due to frictional contacts in order to preserve at each time of the flange movements the coincidence between the plane of symmetry of said bladder heels and the plane of symmetry of said tire.

2. Vulcanizing press as set forth in claim 1, which further comprises means for varying the relative spacing of said flanges, said means comprising essentially a hydraulic cylinder and piston unit consisting of an annular chamber formed between the socket rigid with said upper flange and the outer wall of the sleeve rigid with said lower flange.

3. Vulcanizing press as set forth in claim 1, comprising means for preserving said coincidence between the planes of symmetry of said tir and said bladder, said last-named means comprising a ball valve inserted in the exhaust circuit of the upper portion of said cylinder and piston unit and an electromagnet for controlling said valve.

4. Vulcanizing press as set forth in claim 1, wherein said socket rigid with said upper flange is tapped at its ends engaging a screw for adjusting the head of said drive shaft.

5. Vulcanizing press as set forth in claim 1, wherein said drive shaft is solid with an abutment plate adapted to be adjusted and to drive the sleeve rigid with said lower flange.

* * * * *